US011350785B2

(12) United States Patent
Noordhuis

(10) Patent No.: US 11,350,785 B2
(45) Date of Patent: Jun. 7, 2022

(54) DEVICE FOR MAKING A BEVERAGE

(71) Applicant: KONINKLIJKE PHILIPS N.V., Eindhoven (NL)

(72) Inventor: Joeke Noordhuis, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 298 days.

(21) Appl. No.: 16/473,358

(22) PCT Filed: Dec. 19, 2017

(86) PCT No.: PCT/EP2017/083661
§ 371 (c)(1),
(2) Date: Jun. 25, 2019

(87) PCT Pub. No.: WO2018/122055
PCT Pub. Date: Jul. 5, 2018

(65) Prior Publication Data
US 2019/0343327 A1    Nov. 14, 2019

(30) Foreign Application Priority Data

Dec. 27, 2016 (EP) .................................. 16206965

(51) Int. Cl.
*A47J 31/46* (2006.01)
*F16K 7/17* (2006.01)
(52) U.S. Cl.
CPC .......... *A47J 31/461* (2018.08); *A47J 31/468* (2018.08); *F16K 7/17* (2013.01)
(58) Field of Classification Search
CPC ...... A47J 31/106; A47J 31/461; A47J 31/468; A47J 31/469; F16K 7/12–17; F16K 31/0672
See application file for complete search history.

(56) References Cited

U.S. PATENT DOCUMENTS 4,224,963 A * 9/1980 Stahle ..................... F16K 25/02
                                                      137/897
2003/0066431 A1* 4/2003 Fanzutti ................. A47J 31/469
                                                       99/279
(Continued)

FOREIGN PATENT DOCUMENTS

CN         102970908 A      3/2013
CN         105263375 A      1/2016
(Continued)

OTHER PUBLICATIONS

Paul Evans, How Solenoid Valves Work, May 22, 2019, TheEngineeringMindset.com, https://theengineeringmindset.com/how-solenoid-valves-work/ (Year: 2019).*

*Primary Examiner* — John J Norton
(74) *Attorney, Agent, or Firm* — Schott, P.C.

(57) ABSTRACT

A beverage maker comprises a heating unit for heating a liquid, a functional unit for accommodating a quantity of a beverage basic material, the functional unit being positioned at an outlet side of the heating unit, and a valve unit including a membrane being positioned at an interface of an inlet of the functional unit and an outlet of the heating unit, and a biasing member for biasing the membrane towards a position for realizing the closed position of the valve unit. The inlet of the functional unit is configured and arranged to be open towards a central portion of the membrane, and the outlet of the heating unit is configured and arranged to be open towards a ring-shaped portion of the membrane encompassing the central portion.

10 Claims, 2 Drawing Sheets

(56) References Cited

U.S. PATENT DOCUMENTS

| | | | |
|---|---|---|---|
| 2006/0207432 A1 | 9/2006 | Van Der Meer et al. | |
| 2013/0168592 A1* | 7/2013 | Yan ................... | F16K 31/0672 |
| | | | 251/331 |
| 2015/0250352 A1* | 9/2015 | Ozanne ............... | F16K 27/0209 |
| | | | 99/300 |
| 2018/0119833 A1* | 5/2018 | Nakanishi ............ | F04B 13/00 |

FOREIGN PATENT DOCUMENTS

| | | |
|---|---|---|
| CN | 105832151 A | 8/2016 |
| DE | 8900220 U1 | 3/1989 |
| DE | 202006015652 U1 | 2/2008 |
| EP | 2813163 A1 | 12/2014 |

* cited by examiner

DEVICE FOR MAKING A BEVERAGE

CROSS-REFERENCE TO RELATED APPLICATION

This application is a U.S. National Phase application under 35 U.S.C. § 371 of International Application No. PCT/EP2017/083661, filed on Dec. 19, 2017, which claims the benefit of International Application No. 16206965.2 filed on Dec. 27, 2016. These applications are hereby incorporated by reference herein.

FIELD OF THE INVENTION

The invention relates to a device for making a beverage on the basis of interaction between a beverage basic material and a liquid, comprising: a heating unit for heating the liquid, a functional unit for accommodating a quantity of the beverage basic material, the functional unit being positioned at an outlet side of the heating unit for receiving hot liquid from the heating unit during operation of the device, and a valve unit that is configured and arranged to allow liquid communication between the functional unit and the heating unit, in an open position thereof, and to block liquid communication between the functional unit and the heating unit, in a closed position thereof.

BACKGROUND OF THE INVENTION

A well-known example of a device for making a beverage is a coffee maker. The background of the invention will now be explained in the context of this example, which should not be understood such as to mean that the invention is limited to this example.

Among other things, a coffee maker comprises a heating unit for heating water to be used in a coffee making process, the water being taken from a water container or another source of water. The heating unit may be provided in the form of a boiler, which is an arrangement for heating a stationary quantity of water, or in the form of a thermoblock or flow-through heater, which is an arrangement for heating water flowing through the arrangement. Furthermore, a coffee maker is equipped with a brewing chamber, which is the functional unit of the device, being designed for letting the actual coffee making process take place during operation of the device. In particular, the brewing chamber is designed to accommodate a quantity of coffee basic material, which may come in the form of a pad filled with ground coffee, a quantity of freshly ground coffee held in a suitable receptacle, or any other suitable form, and to receive hot water from the heating unit. During operation of the coffee maker, the water is heated to a suitable temperature and subsequently made to interact with a quantity of coffee basic material in the brewing chamber, as a result of which coffee is obtained, which is dispensed from the device through a dispensing outlet thereof.

For the purpose of displacing the various liquids through the coffee maker, i.e. cold water to the heating unit, hot water from the heating unit to the brewing chamber, and coffee from the brewing chamber to the dispensing outlet, suitable means such as a pump are applied in the device. Furthermore, under the influence of the action of such means, it is possible to have a liquid pressure inside the brewing chamber which is suitable for realizing an appropriate coffee making process in the brewing chamber, resulting in coffee of good quality and taste.

For the purpose of preventing backflow of coffee from the brewing chamber to the heating unit, a valve unit is provided at a position between the brewing chamber and the heating unit. The valve unit is configured and arranged to allow liquid communication between the brewing chamber and the heating unit, in an open position thereof, and to block liquid communication between the brewing chamber and the heating unit, in a closed position thereof. Also, in case the coffee maker comprises a heating unit in the form of a boiler or a thermoblock, the valve unit has a function in keeping the water inside the heating unit during a heating process.

In the field of coffee makers, it is commonly known for the valve unit located between the brewing chamber and the heating unit to comprise a ball valve or a poppet valve, for example. Irrespective of the particular type of valve unit, a problem associated with the valve unit is that adherence of limestone takes place. The amount of limestone may eventually be so large that the valve unit can no longer function as intended. Among other things, deposition of limestone on the elements of the valve unit may cause the elements to adhere, so that putting the valve unit from the closed position to the open position needs a higher force than foreseen, wherein it may even be so that the force gets so high that it cannot be realized inside the coffee maker, in which case the valve unit remains in the closed position.

US 2006/207432 A1 discloses a beverage maker having a valve structure that is adapted to block the return of water from a boiler to a water reservoir, and that further includes a discharge outlet connected for water outflow to a brewing unit. From the boiler, a water discharge channel extends via the valve structure to the brewing unit. The valve structure is an integrated valve structure in which a return flow control valve is integrated with a discharge control valve, the discharge control valve comprising a membrane, and the return flow control valve forming part of the membrane of the discharge control valve.

DE 89 00 220 U1 discloses a valve or mixing device for blocking/opening a liquid passage or allowing liquids to mix, comprising a valve plunger and a valve housing. An inlet channel and an outlet channel for the liquids are present in the valve housing. Further, in the valve housing, a valve seat is located, wherein an elastic membrane is arranged between the valve plunger and the valve seat.

DE 20 2006 015652 U1 discloses a brewing unit for a coffee maker. A hot water conduit is connected to a hot water connection area of the brewing unit, wherein an inlet valve and a member for closing the inlet valve are arranged in the hot water connection area. The inlet valve is a membrane valve, comprising a membrane that is arranged in a housing of the inlet valve, and the member for closing the inlet valve is a plunger acting on the membrane.

SUMMARY OF THE INVENTION

It is an object of the invention to alleviate the problems as mentioned, particularly to provide a valve unit of another design than commonly known, being significantly less susceptible to calcification. In view thereof, the invention provides a device as defined in the opening paragraph, i.e. a device for making a beverage on the basis of interaction between a beverage basic material and a liquid, comprising: a heating unit for heating the liquid, a functional unit for accommodating a quantity of the beverage basic material, the functional unit being positioned at an outlet side of the heating unit for receiving hot liquid from the heating unit during operation of the device, and a valve unit that is configured and arranged to allow liquid communication between the functional unit and the heating unit, in an open position thereof, and to block liquid communication between the functional unit and the heating unit, in a closed position thereof, wherein the valve unit is of a design according to which the valve unit comprises a membrane being positioned at an interface of an inlet of the functional unit and an outlet of the heating unit, and a biasing member for biasing the membrane towards a position for realizing the closed position of the valve unit, wherein the inlet of the functional unit is configured and arranged to be open towards a central portion of the membrane, and wherein the outlet of the heating unit is configured and arranged to be open towards a ring-shaped portion of the membrane encompassing the central portion.

The choice of using a valve unit comprising a membrane at the position between the functional unit and the heating unit is not just arbitrary, but has some surprising advantages as will now be explained. Changing the position of such a type of valve unit, which will hereinafter also be referred to as membrane valve, involves moving and flexing the membrane. This typical feature of a membrane valve seems to have a beneficial influence on the prevention of calcification thereof. Furthermore, by having a membrane valve, it appears to be possible to comply with various requirements, including 1) having guaranteed priming, i.e. filling of the heating unit at first use of the device, to which end a certain opening pressure of the valve unit needs to be realized, 2) avoiding liquid from being sucked back from the functional unit to the heating unit by having a sufficiently high contact pressure, 3) being practically insusceptible to sticking phenomena between valve elements which are supposed to be capable of moving between respective mutual positions of contact and no contact, and 4) being practically insusceptible to calcification. A poppet valve, for example, is known for not being capable of fulfilling all requirements. Besides, a poppet valve used at a wet/dry interface needs radial sealing and has internal friction as a consequence thereof, whereas a membrane valve does not as it relies on deformation of the membrane, so that spread of properties of the valve unit is only related to tolerances of the biasing member.

According to an insight underlying the invention, it is possible to use the membrane valve in two distinct ways, namely with an inlet of the membrane valve being associated with a central portion of the membrane and an outlet of the membrane valve being associated with a ring-shaped portion of the membrane encompassing the central portion, or with the inlet of the membrane valve being associated with the ring-shaped portion of the membrane and the outlet of the membrane being associated with the central portion of the membrane. For the sake of clarity, in the following, the first way will hereinafter be referred to as conventional way, and the second way as reversed way. In the device according to the invention, using the membrane valve in the reversed way implies a configuration and arrangement of the inlet of the functional unit in which that inlet is open towards a central portion of the membrane, and a configuration and arrangement of the outlet of the heating unit in which that outlet is open towards a ring-shaped portion of the membrane encompassing the central portion. In such reversed use of the membrane valve, the larger part of the total membrane area is addressed for the purpose of opening the membrane valve against the action of the biasing member, which implies that for complying with a given value of the opening pressure of the membrane valve, a stronger biasing member can be used in comparison with a conventional configuration and arrangement in which the biasing member needs to be weaker for avoiding the opening pressure from being too high. Advantages of using a stronger biasing member are that a higher contact pressure can be realized, assuming the same dimensions of a line or area of contact, and that a crushing effect on limestone depositions can apparently be obtained when the membrane valve is put from the open position to the closed position. On the basis of these facts, it appears to be very advantageous to use a membrane valve in the reversed way at the position between the functional unit and the heating unit of a beverage maker such as a coffee maker, which is an insight that is not known in the art, and which has only been found in the present context of the invention.

In a practical embodiment of the device according to the invention, the membrane is configured and arranged to cover a surface of a body element of the device, which surface is provided with interruptions at positions associated with the inlet of the functional unit and the outlet of the heating unit. Hence, the valve unit may be designed such that the biasing member is arranged for acting on one side of the membrane, while surface interruptions associated with the inlet of the functional unit and the outlet of the heating unit, respectively, are present at the other side of the membrane. The biasing member may be any suitable type of member for pressing the membrane in the direction of the surface, and may comprise a spring-loaded piston having a head that is specifically designed for contacting the one side of the membrane, for example. Preferably, the surface is a surface of the heating unit or the functional unit, so that thermal losses can be minimized and compactness of design can be maintained. For the purpose of letting the valve unit properly fulfill the sealing function between the inlet of the functional unit and the outlet of the heating unit in the closed position, it is advantageous for the biasing member to be arranged and configured to press the membrane against at least a portion of the surface as present between the interruption associated with the inlet of the functional unit and the interruption associated with the outlet of the heating unit.

As explained in the foregoing, it is advantageous to have a configuration and arrangement of the inlet of the functional unit in which that inlet is open towards a central portion of the membrane, and a configuration and arrangement of the outlet of the heating unit in which that outlet is open towards a ring-shaped portion of the membrane encompassing the central portion. In view thereof, it is advantageous for the surface to be provided with a centrally arranged hole encompassed by a ring-shaped groove, the centrally arranged hole being associated with the inlet of the functional unit and the ring-shaped groove being associated with the outlet of the heating unit. The ring-shaped groove does not necessarily need to have the shape of a complete ring and may designed as a ring segment only, but it is very practical to have a complete ring shape in view of realizing an even load distribution across the membrane.

Sticking effects between the membrane and the surface can be prevented by minimizing an area of the contact between those two elements. To that end, it may be so that at least one of the membrane and the surface is provided with at least one ring-shaped corrugation for realizing contact along a line between the membrane and the surface in the closed position of the valve unit.

The membrane may be held in the device in any suitable way. For example, the membrane may be provided with a thickened peripheral rim, thereby allowing for an arrangement in which the membrane is held in the device at the position of the peripheral rim. In particular, the peripheral rim may be sandwiched between two elements of the device being positioned opposite to each other, wherein one of those elements may be the body element as mentioned in the foregoing, i.e. the body element having the surface against which the membrane is to be pressed for closing the valve unit.

Within the framework of the invention, an embodiment of the device is feasible in which the device comprises an element that is controllable for putting the valve unit from the closed position to the open position by mechanically acting on the membrane. Such an element may be a lever, for example, that is arranged in parallel for mechanically opening the valve unit, which may be beneficial for priming reasons.

The above-described and other aspects of the invention will be apparent from and elucidated with reference to the following detailed description of an embodiment of a device for making a beverage on the basis of interaction between a beverage basic material and a liquid, particularly a coffee maker, comprising a valve unit that is designed like a membrane valve.

BRIEF DESCRIPTION OF THE DRAWINGS

The invention will now be explained in greater detail with reference to the figures, in which equal or similar parts are indicated by the same reference signs, and in which.

DETAILED DESCRIPTION OF THE EMBODIMENTS

The invention will now be explained in the context of a coffee maker 1, which does not alter the fact that the invention is applicable to other types of a device for making a beverage on the basis of interaction between a beverage basic material and a liquid, and that the following explanation is relevant for such other types as well.

Figure 1:
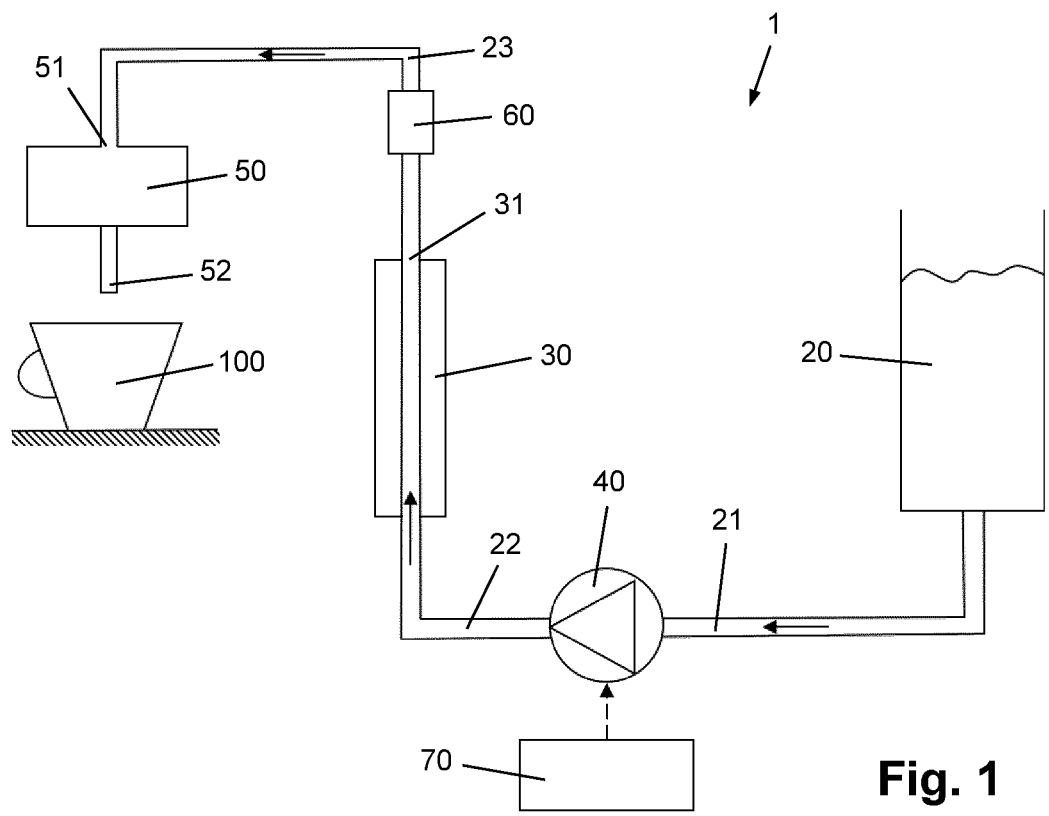
FIG. 1 diagrammatically shows a basic set-up of a coffee maker according to the invention.

FIG. 1 diagrammatically shows a basic set-up of the coffee maker 1 according to the invention. In general, a coffee maker is a device that is suitable for making coffee on the basis of hot water and a quantity of coffee basic material, wherein the coffee basic material is provided as ground coffee ground in most practical cases. Ground coffee may be supplied to a cup-like element (not shown) of the coffee maker 1 for receiving and containing ground coffee, but may also come in coffee pads (not shown) or other enclosures which are to be put in an appropriate place in the coffee maker 1. Besides a number of components of the coffee maker 1, FIG. 1 also shows a receptacle 100 such as a cup for receiving the coffee from the coffee maker 1.

The coffee maker 1 comprises a water reservoir 20 for containing water, a thermoblock 30 for supplying heat to the water, a pump 40 for pumping water from the water reservoir 20 to the thermoblock 30 and further downstream of the thermoblock 30, and a functional unit where the actual coffee making process is supposed to take place during operation of the coffee maker 1. The functional unit of the coffee maker 1 is referred to as brewing chamber 50. In particular, the brewing chamber 50 is designed for accommodating a quantity of ground coffee, and is configured and arranged for receiving hot water from the thermoblock 30.

If the coffee maker 1 is suitable to be used for processing coffee pads, it may be practical for the brewing chamber 50 to be openable and closeable by a user. Advantageously, in such a case, the brewing chamber 50 is properly sealed in the closed position so as to avoid pressure losses during the coffee making process.

It is noted that the coffee maker 1 may comprise any suitable type of heating unit for heating the water, and that the heating unit does not necessarily need to be a thermoblock 30. In view thereof, the description of the present example of the invention is not exclusively applicable to a beverage maker comprising a thermoblock 30, but is relevant to beverage makers comprising another type of heating unit as well. It is also noted that any type of water supply to the heating unit is possible within the framework of the invention. Hence, it is not essential for the device according to the invention to comprise a water reservoir 20, and the description of the present example of the invention is equally applicable in the context of water supply alternatives. Furthermore, the invention is not restricted to any type of beverage basic material and/or liquid, and the description of the present example of the invention is therefore not restricted to ground coffee as an example of beverage basic material nor to water as an example of liquid to be used in a beverage making process.

Between an outlet 31 of the thermoblock 30 and an inlet 51 of the brewing chamber 50, a valve unit 60 is arranged, which is designed for allowing liquid to flow from the thermoblock 30 to the brewing chamber 50 when the pump 40 is operated, and for preventing backflow from the brewing chamber 50 to the thermoblock 30 when the pump 40 is switched off. Details of the valve unit 60 will be explained later with reference to FIGS. 2 and 3.

The various components 20, 30, 40, 50, 60 are interconnected through conduits 21, 22, 23 such as tubes or hoses for transporting water. As seen in a direction downstream of the water reservoir 20, a first conduit 21 extends between the water reservoir 20 and the pump 40, a second conduit 22 extends between the pump 40 and the valve unit 60, through the thermoblock 30, and a third conduit 23 extends between the valve unit 60 and the brewing chamber 50. For the purpose of controlling the coffee maker 1 so as to realize an appropriate coffee making process during operation, the coffee maker 1 is equipped with a controller 70 that serves for controlling operation of the pump 40, as indicated through a dashed arrow extending from the controller 70 to the pump 40 in FIG. 1, and for performing other suitable controlling tasks. For example, the coffee maker 1 may be provided with a functionality of checking a water level in the water reservoir 20 and providing an indication to the user in a situation in which the water level is too low or in which the water reservoir 20 is completely empty, in which case the functionality can be realized by using the controller 70 in combination with a suitable sensing arrangement and a suitable indication arrangement. In a general sense, the controller 70 is suitable to be used for guaranteeing proper operation of the coffee maker 1, following algorithms for activating and deactivating the pump 40, and also following algorithms for realizing additional (safety) functionalities of the device. The coffee maker 1 may be equipped with a user interface for conveying input provided by a user to the controller 70.

When a user desires to make a cup of coffee by using the coffee maker 1, operation of the coffee maker 1 is initiated. Among other things, operation of the coffee maker 1 involves activation of the thermoblock 30 and the pump 40, so that water can be transported through the thermoblock 30 and heated. The valve unit 60 is biased towards a closed position thereof, and the pressure exerted by the pump 40 during operation thereof is also used for putting the valve unit 60 to an open position thereof, in which the valve unit 60 is capable of allowing hot water to flow from the thermoblock 30 to the brewing chamber 50. In the brewing chamber 50, the hot water is made to interact with a quantity of ground coffee, at a certain pressure. Finally, the coffee that is obtained is dispensed from the coffee maker 1 through a dispensing outlet 52 thereof. When the pump 40 is deactivated, the pressure is released, and the valve unit 60 returns to the closed position, so that backflow of coffee from the brewing chamber 50 to the thermoblock 30 cannot take place. A normal/desired direction of the liquid through the coffee maker 1 during operation thereof is indicated through arrows in FIG. 1.

Figure 2:
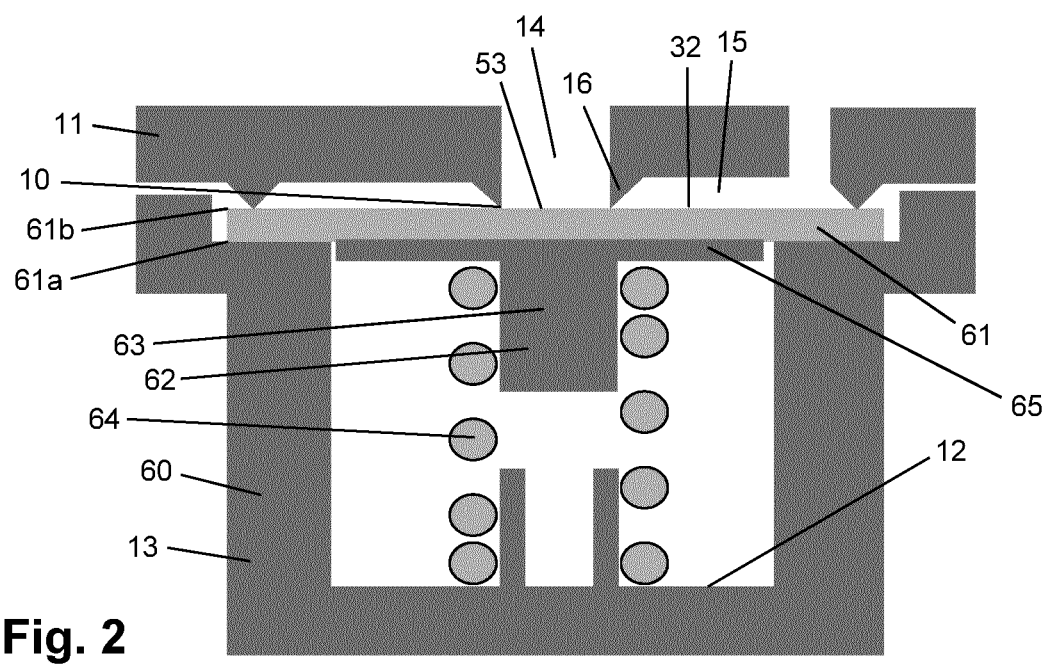
FIG. 2 diagrammatically shows a basic set-up of a membrane valve as applied in the coffee maker.
Figure 3:
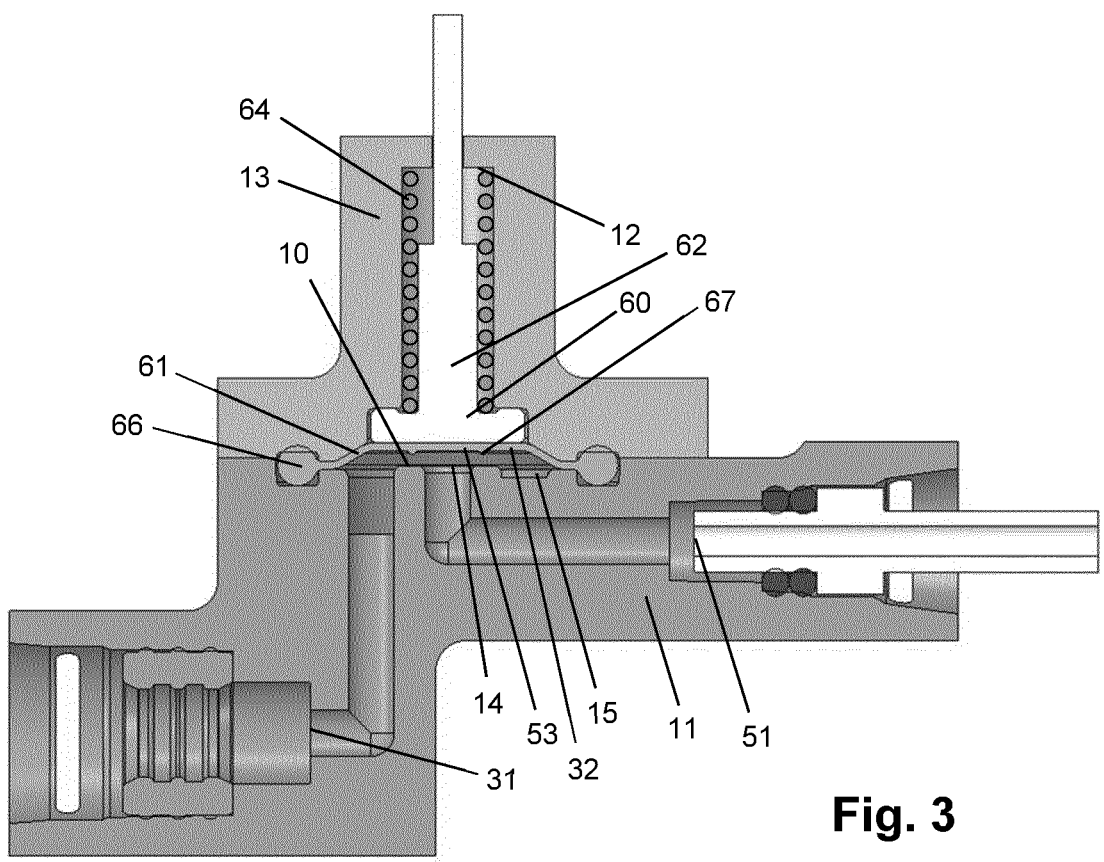
FIG. 3 diagrammatically shows a sectional view of a portion of the coffee maker, particularly a portion in which the membrane valve is incorporated.

In a general sense, the coffee maker 1 is similar to known coffee makers, comprising similar components like the water reservoir 20, the thermoblock 30, the pump 40, the brewing chamber 50, the valve unit 60, and the controller 70. The invention is especially applicable to the design of the valve unit 60 as will now be explained, the valve unit 60 of the coffee maker 1 according to the invention being of the type comprising a membrane 61 and a biasing member 62 for biasing the membrane 61 towards a position for realizing the closed position of the valve unit 60. Hence, according to the invention, the valve unit 60 as located between the outlet 31 of the thermoblock 30 and the inlet 51 of the brewing chamber 50 is a membrane valve. FIG. 2 serves for illustrating the particulars of this type of valve unit, which is also known as diaphragm valve, as applied in the coffee maker 1. FIG. 3 diagrammatically shows a sectional view of a portion of the coffee maker 1, particularly a portion in which the valve unit 60 is incorporated, wherein both the open position and the closed position of the valve unit 60 and the different appearances of the membrane 61 associated with those two positions are illustrated.

In the configuration and arrangement of the valve unit 60 as shown in FIGS. 2 and 3, one side 61a of the membrane 61 faces the biasing member 62, and another side 61b of the membrane 61 faces a membrane contacting surface 10 of a body element 11 of the coffee maker 1, which surface 10 is interrupted at positions associated with the inlet 51 of the brewing chamber 50 and the outlet 31 of the thermoblock 30.

In the shown example, the biasing member 62 comprises a combination of a piston 63 and a coil spring 64 encompassing the piston 63 and acting on the piston 63 for biasing the piston 63 in the direction of the membrane 61 and the membrane contacting surface 10. The piston 63 has a head 65 which is dimensioned such as to cover most of the membrane 61, whereby a favorable distribution of biasing forces across the membrane 61 is obtained. In the shown example, the spring 64 extends between the head 65 of the piston 63 and a supporting surface 12 of a body element 13 of the coffee maker 1.

Within the framework of the invention, the biasing member 62 of the valve unit 60 may comprise any suitable contacting means for contacting the membrane 61, and any suitable biasing means for biasing the contacting means in the direction of the membrane 61 and the membrane contacting surface 10, thereby biasing the membrane 61 towards the surface 10. The description of the present example of the invention is equally applicable in the context of alternative embodiments of the biasing member 62.

Advantageously, the membrane 61 comprises a flexible/deformable material such as a rubbery material or silicones. The membrane 61 may be held in the coffee maker 1 in any suitable way. In FIG. 3, an option of having a thickened peripheral rim 66 on the membrane 61 and sandwiching the peripheral rim 66 between two body portions 11, 13 of the coffee maker 1 is shown.

In the shown example, the membrane contacting surface 10 is provided with a centrally arranged hole 14 encompassed by a ring-shaped groove 15, whereby the interrupted appearance of the surface 10 as mentioned in the foregoing is formed, the centrally arranged hole 14 being associated with the inlet 51 of the brewing chamber 50 and the ring-shaped groove 15 being associated with the outlet 31 of the thermoblock 30. In this way, it is achieved that the inlet 51 of the brewing chamber 50 is open towards a central portion 53 of the membrane 61, namely a portion 53 of the membrane 61 facing the centrally arranged hole 14 in the membrane contacting surface 10, and that the outlet 31 of the thermoblock 30 is open towards a ring-shaped portion 32 of the membrane 61, namely a portion 32 of the membrane 61 facing the ring-shaped groove 15 in the membrane contacting surface 10. In the closed position of the valve unit 60 as illustrated in FIG. 2, the membrane 61 is pressed against the membrane contacting surface 10 as present between the ring-shaped groove 15 and the centrally arranged hole 14, which constitutes a ring-shaped contacting surface portion in the shown example. Contrariwise, in the open position, space is present between the membrane 61 and the ring-shaped contacting surface portion, thereby enabling liquid communication between the centrally arranged hole 14 and the ring-shaped groove 15 in the membrane contacting surface 10, i.e. liquid communication between the brewing chamber 50 and the thermoblock 30.

It is practical for the membrane 61 to have a substantially circular periphery. It is furthermore practical for the centrally arranged hole 14 in the membrane contacting surface 10 to have a circular periphery as well, and also for the ring-shaped groove 15 in the membrane contacting surface 10 and the ring-shaped contacting surface portion to have a circular appearance. However, the invention is by no means restricted to these optional design features.

Preferably, in order to prevent the membrane 61 from sticking on the membrane contacting surface 10 and thereby keeping the valve unit 60 in the closed position even in situations in which the valve unit 60 is actually supposed to be put to the open position, measures are taken for ensuring that the membrane 61 and the membrane contacting surface 10 contact each other along a line in the closed position of the valve unit 60. In other words, measures are taken for minimizing the area of contact between the membrane 61 and the membrane contacting surface 10. In this respect, it is noted that FIG. 2 illustrates an option of having a ring-shaped corrugation 16 on the membrane contacting surface 10, the ring-shaped corrugation 16 having only a relatively very small width at a top side thereof, and that similarly, FIG. 3 illustrates an option of having a ring-shaped corrugation 67 on the membrane 61, the ring-shaped corrugation 67 having only a relatively very small width at a top side thereof.

Some general aspects of the way in which the valve unit 60 functions in the coffee maker 1 will now be explained. When the coffee maker 1 is in an inactive state, the valve unit 60 is in the closed position, as no pressure acts on the membrane 61 in that situation, so that the membrane 61 is pressed against the ring-shaped contacting surface portion under the influence of the biasing member 62. Thus, when the coffee maker 1 is in an inactive state, liquid communication between the brewing chamber 50 and the thermoblock 30 is blocked. When the coffee maker 1 is operated, the pump 40 is activated, as a result of which pressure starts to build up in the water. As a consequence, an increasing pressure is exerted on the ring-shaped portion 32 of the membrane 61. The very moment that the pressure exerted by the water on the membrane 61 on the one side 61*b* thereof is high enough for counteracting the pressure exerted by the biasing member 62 on the membrane 61 on the other side thereof 61*a*, the membrane 61 is deformed to such an extent that contact between the membrane 61 and the ring-shaped contacting surface portion is lost. Hence, at that moment, water is allowed to pass the valve unit 60 and to flow from the thermoblock 30 to the brewing chamber 50. When the pumping action is stopped and the pressure exerted by the water on the membrane 61 from the side 61*b* facing the membrane contacting surface 10 decreases as a result thereof, a situation is obtained in which the pressure gets so low that the valve unit 60 returns to the closed position under the influence of the action of the biasing member 62, wherein the membrane 61 is deformed and positioned such as to contact the ring-shaped contacting surface portion again, thereby blocking liquid communication between the brewing chamber 50 and the thermoblock 30. In that way, backflow of coffee from the brewing chamber 50 to the thermoblock 30 is effectively prevented.

In the context of a coffee maker 1, it is important to have measures aimed at preventing calcification. To that end, it is beneficial to choose dimensions of the various components of the coffee maker 1 so as to be large enough for avoiding water blocking effects under the influence of depositions of limestone. In view thereof, in respect of the valve unit 60, it is practical for the diameter of the centrally arranged hole 14 in the membrane contacting surface 10 to be larger than 2-2.5 mm. For example, the diameter as mentioned may be 3 mm. The stroke of the membrane 61 may be chosen so as to be 1 mm or a somewhat higher value. The fact that dimensions are mentioned here should not be understood as having a limiting effect on the scope of protection whatsoever; those dimensions are mentioned for illustrative purposes only.

Advantages of the use of the valve unit 60 as described in the foregoing include the possibility of having a biasing member 62 which is sufficiently strong for inducing a crushing effect on any limestone as may be present in the valve unit 60 when the valve unit 60 is put from the open position to the closed position, and also for realizing a relatively high contact pressure so that the valve unit 60 is really leakproof in the closed position, and the possibility of having a minimal contact area between the membrane 61 and the membrane contacting surface 10 in the closed position, whereby sticking effects are prevented. In the configuration of the valve unit 60 as explained in the foregoing, the biasing member 62 may be relatively strong without resulting in an impractical increase of the opening pressure of the valve unit 60, as the relatively large ring-shaped portion 32 of the membrane 61 is addressed when it is appropriate to put the valve unit 60 from the closed position to the opened position.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details that are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species".

The invention claimed is:

1. A device for making a beverage on the basis of interaction between a beverage basic material and a liquid, the device comprising:
    a heating unit for heating the liquid;
    a functional unit for accommodating a quantity of the beverage basic material, the functional unit being positioned at an outlet side of the heating unit for receiving hot liquid from the heating unit during operation of the device; and
    a valve unit that is configured and arranged to allow liquid communication between the functional unit and the heating unit, in an open position thereof, and to block the liquid communication between the functional unit and the heating unit, in a closed position thereof, wherein the valve unit is configured to be in the open position or in the closed position based at least on pressure exerted by a pump, the valve unit comprising a membrane being positioned at an interface of an inlet of the functional unit and an outlet of the heating unit, and a biasing member for biasing the membrane towards a position for realizing the closed position of the valve unit, wherein the inlet of the functional unit is configured and arranged to be open towards a central portion of the membrane, and wherein the outlet of the heating unit is configured and arranged to be open towards a ring-shaped portion of the membrane encompassing the central portion.

2. The device according to claim 1, wherein the membrane is configured and arranged to cover a surface of a body element of the device, and wherein the surface is provided with interruptions at positions associated with the inlet of the functional unit and the outlet of the heating unit.

3. The device according to claim 2, wherein the biasing member is arranged and configured to press the membrane against at least a portion of the surface as present between the interruptions associated with the inlet of the functional unit and the outlet of the heating unit.

4. The device according to claim 2, wherein the surface is provided with a centrally arranged hole encompassed by a ring-shaped groove, the centrally arranged hole being associated with the inlet of the functional unit and the ring-shaped groove being associated with the outlet of the heating unit.

5. The device according to claim 2, wherein at least one of the membrane and the surface is provided with at least one ring-shaped corrugation for realizing contact along a line between the membrane and the surface in the closed position of the valve unit.

6. The device according to claim 1, wherein the membrane has a thickened peripheral rim, and is held in the device at the position of the peripheral rim.

7. The device according to claim 1, further comprising:
the pump configured for pumping the liquid to the heating unit; and
a controller configured for putting the valve unit from the closed position to the open position by mechanically acting on the membrane.

8. The device according to claim 7, wherein the controller is further configured for activating and deactivating the pump.

9. The device according to claim 8, wherein, when the pump is activated, the pressure exerted by the pump puts the valve unit to the open position from the closed position.

10. The device according to claim 9, wherein, when the pump is deactivated, the pressure exerted by the pump is released, and the valve unit returns to the closed position from the open position.

* * * * *